US008091037B2

(12) United States Patent
Bicker et al.

(10) Patent No.: US 8,091,037 B2
(45) Date of Patent: Jan. 3, 2012

(54) PROVIDING AN OVERVIEW OF AN OBJECT

(75) Inventors: Sandra Bicker, Heidelberg (DE); Iris Nieder, Walldorf (DE); Annett Hardt, Mannheim (DE); Ingo Deck, Mannheim (DE); Erik Oster, Heidelberg (DE); Till Brinkmann, Mannheim (DE); Boris Bierbaum, Frankfurt am Main (DE); Martin Dauer, Alsting (DE); Theo Held, Wiesloch (DE); Martin Schrepp, Hockenheim (DE)

(73) Assignee: SAP AG, Walldorf (DE)

( * ) Notice: Subject to any disclaimer, the term of this patent is extended or adjusted under 35 U.S.C. 154(b) by 760 days.

(21) Appl. No.: 11/618,324

(22) Filed: Dec. 29, 2006

(65) Prior Publication Data

US 2007/0266339 A1 Nov. 15, 2007

Related U.S. Application Data

(60) Provisional application No. 60/800,055, filed on May 12, 2006.

(51) Int. Cl.
*G06F 3/048* (2006.01)

(52) U.S. Cl. ......... 715/765; 715/764; 715/853; 715/854

(58) Field of Classification Search .................. 707/1, 3, 707/103; 715/764, 765, 853, 854
See application file for complete search history.

(56) References Cited

U.S. PATENT DOCUMENTS

| | | | |
|---|---|---|---|
| 6,829,615 B2 * | 12/2004 | Schirmer et al. | 707/102 |
| 7,107,268 B1 * | 9/2006 | Zawadzki et al. | 707/9 |
| 7,194,695 B1 * | 3/2007 | Racine et al. | 715/780 |
| 7,203,909 B1 * | 4/2007 | Horvitz et al. | 715/765 |
| 7,565,613 B2 * | 7/2009 | Forney | 715/745 |
| 2002/0075312 A1 * | 6/2002 | Amadio et al. | 345/764 |
| 2002/0158899 A1 * | 10/2002 | Raymond | 345/736 |
| 2003/0212654 A1 * | 11/2003 | Harper et al. | 707/1 |
| 2004/0001103 A1 * | 1/2004 | Fliess et al. | 345/810 |
| 2005/0076311 A1 * | 4/2005 | Kusterer et al. | 715/853 |
| 2005/0283463 A1 * | 12/2005 | Dill et al. | 707/2 |
| 2005/0283642 A1 * | 12/2005 | Dill | 714/4 |
| 2006/0293944 A1 * | 12/2006 | Igelbrink et al. | 705/9 |

OTHER PUBLICATIONS

SAP AG, CRM 5.0 Screen shot for a business object having address information, 1 page, on sale before May 11, 2006.

(Continued)

*Primary Examiner* — Steven Sax
*Assistant Examiner* — Grant D Johnson
(74) *Attorney, Agent, or Firm* — Fish & Richardson P.C.

(57) ABSTRACT

A request is received to display a first object in a graphical user interface (GUI) of a computer system containing several objects having more than one type, some of the several objects being associated with each other. An operation mode setting is accessed. In response to the request, an overview screen is displayed including a first GUI component presenting attributes of the first object, and at least one second GUI component, presenting information from at least a second one of the several objects associated with the first object, and configured to operate in (i) an auto load mode for automatically loading and presenting the information upon display, and (ii) a deferred load mode where the information is loaded and presented upon the user activating the second GUI component. The second GUI component uses one of the auto load mode and the deferred load mode based on the operation mode setting.

18 Claims, 6 Drawing Sheets

OTHER PUBLICATIONS

SAP AG, CRM 5.0 Screen shot for a business object with additional address information, 1 page, on sale before May 11, 2006.

SugarCRM, Screen shot from "Sugar Suite," 1 page, on sale no later than May 11, 2006.

'Product Catalog—Sales Force Automation (SFA)' [online]. Salesforce.com, published no later than Dec. 28, 2005, [retrieved on Jan. 11, 2007]. Retrieved from the Internet: <URL:web.archive.org/web/20051219055233/www.salesforce.com/products/feature.jsp?na>, 2 pages.

'SugarCRM—CRM Software' [online]. SugarCRM, published no later than Dec. 28, 2005, [retrieved on Jan. 11, 2007]. Retrieved from the Internet: <URL: web.archive.org/web/20051228024337/http://www.sugarcrm.com/crm/>, 2 pages.

Salesforce.com, Screen shot from "Salesforce.com- Professional Edition," 2 pages, on sale no later than May 11, 2006.

\* cited by examiner

FIG. 1

Figure 2:
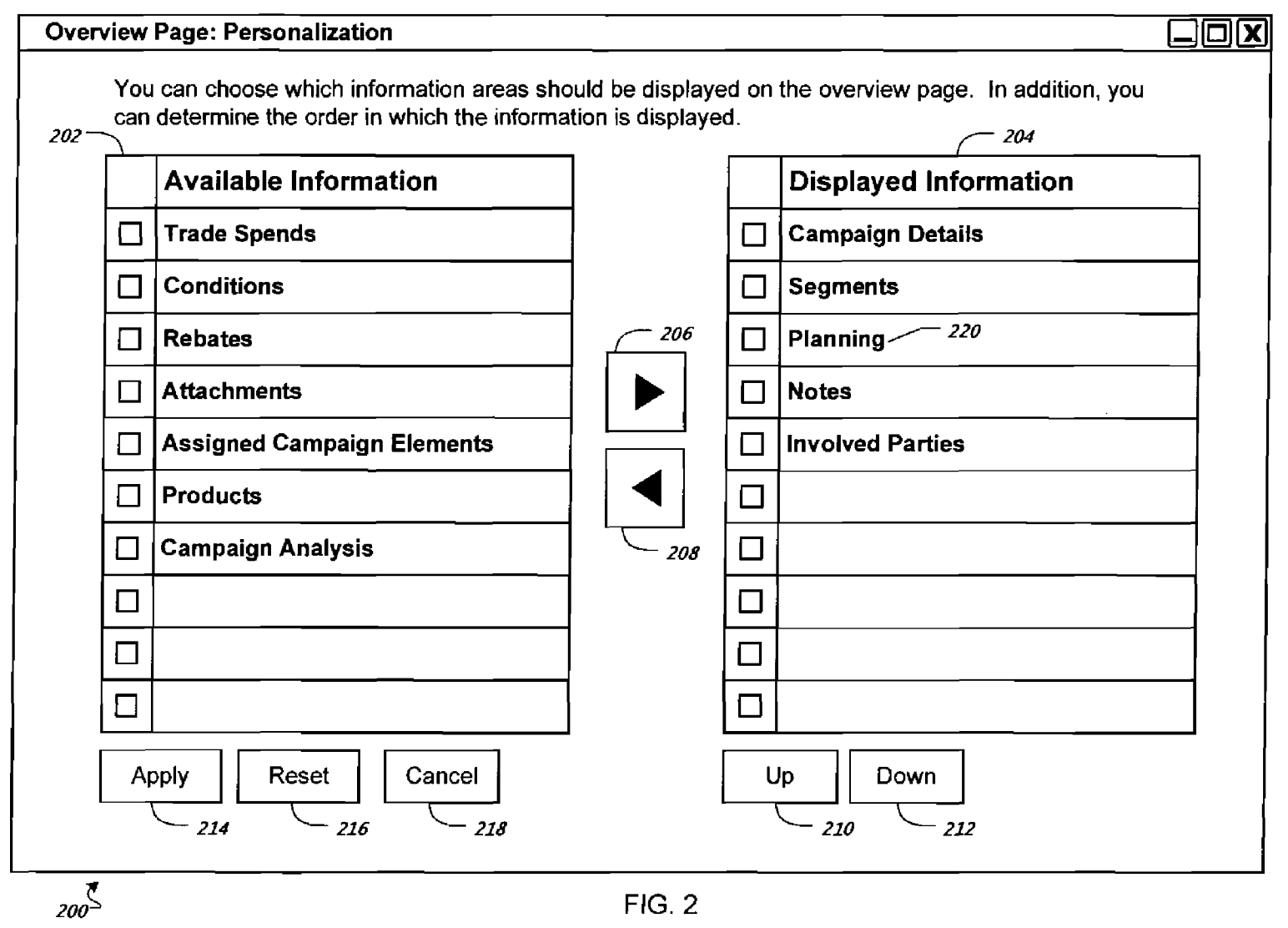

Overview Page: Personalization — 202

You can choose which information areas should be displayed on the overview page. In addition, you can determine the order in which the information is displayed.

Available Information — 204

| ☐ | Trade Spends |
| ☐ | Conditions |
| ☐ | Rebates |
| ☐ | Attachments |
| ☐ | Assigned Campaign Elements |
| ☐ | Products |
| ☐ | Campaign Analysis |
| ☐ | |
| ☐ | |
| ☐ | |

▲ 206
▼ 208

Displayed Information

| ☐ | Campaign Details |
| ☐ | Segments |
| ☐ | Planning — 220 |
| ☐ | Notes |
| ☐ | Involved Parties |
| ☐ | |
| ☐ | |
| ☐ | |
| ☐ | |

[Up] 210  [Down] 212

[Apply] 214  [Reset] 216  [Cancel] 218

PROVIDING AN OVERVIEW OF AN OBJECT

CROSS-REFERENCE TO RELATED APPLICATIONS

This application claims priority from U.S. Provisional Application No. 60/800,055, filed May 12, 2006, and entitled "UI Concept," the entire contents of which are incorporated herein by reference.

TECHNICAL FIELD

This document relates to a user interface.

BACKGROUND

Large software systems, for example enterprise resource planning (ERP) or customer relationship management (CRM) systems, can be designed to work with a great number of different object types. In a CRM system from SAP AG, for example, there are the object types accounts, contact persons, campaigns, target groups, orders, opportunities, to name a few examples. A user working with instances of these objects may need access to some or all information in the object from time to time.

These and other objects can, however, contain a great deal of different information, and can therefore be very complex. It can be cumbersome or inefficient for the user if the relevant information is not presented where the user expects it to be, perhaps because one or more additional navigation steps are needed to reach the information. In short, users desire to easily find and quickly access the relevant information. Moreover, the information that is relevant varies from user to user. A proper balance should be struck between the information that is automatically presented to the user—whether the information is part of the object or of an associated object—and that to which the user should navigate in further steps.

SUMMARY

The invention relates to providing an overview of an object.

In a first general aspect, a computer-implemented method for providing an overview of an object includes receiving a request to display to a user a first object in a graphical user interface (GUI) of a computer system. The computer system contains several objects having more than one type, some of the several objects being associated with each other. The method includes accessing an operation mode setting. The method includes displaying an overview screen on the GUI in response to the request. The overview screen includes a first GUI component for presenting attributes of the first object. The overview screen includes at least one second GUI component for presenting information from at least a second one of the several objects that is associated with the first object. The second GUI component is configured to operate in (i) an auto load mode where the information is automatically loaded and presented upon the overview screen being displayed, and (ii) a deferred load mode where the information is loaded and presented upon the user activating the second GUI component. The second GUI component uses one of the auto load mode and the deferred load mode based on the operation mode setting.

Implementations can include all, some or none of these features. The overview screen can be a target for all links to the first object in the computer system. The method can further include displaying all user-editable attributes of the first object in the first GUI component. The first object can be associated with a plurality of objects in the computer system including the second object, and there can exist several second GUI components for presenting information from the plurality of objects in the overview page for the first object. The method can further include displaying the several second GUI components in the overview screen in an order defined by a personalization setting associated with the user, each of the several second GUI components using one of the auto load mode and the deferred load mode based on the personalization setting. The method can further include omitting at least one of the several second GUI components when displaying the overview screen based on the operation mode setting. The information can include a table, and the method can further include presenting the information in the second GUI component using a pagination function wherein the table is distributed over more than one user-selectable page. The method can further include initiating an object services function in response to an input made using the second GUI component. The method can further include updating the first and second GUI components for a third object instead of the first object, the updating being done in response to a user selecting an input control in the second GUI component that identifies the third object.

In a second general aspect, a computer program product is tangibly embodied in an information carrier and includes instructions that, when executed, generate on a display device a graphical user interface for providing an overview of an object. The graphical user interface includes a first GUI component for presenting to a user attributes of a first object in a computer system. The computer system contains several objects having more than one type, some of the several objects being associated with each other. The graphical user interface includes at least one second GUI component for presenting information from at least a second one of the several objects that is associated with the first object. The second GUI component is configured to operate in (i) an auto load mode where the information is automatically loaded and presented upon the GUI being generated, and (ii) a deferred load mode where the information is loaded and presented upon the user activating the second GUI component. The second GUI component uses one of the auto load mode and the deferred load mode based on an operation mode setting.

Implementations can include all, some or none of these features. The first and second GUI components can be included on an overview screen that is a target for all links to the first object in the computer system. The first object can be associated with a plurality of objects in the computer system including the second object, and there can exist several second GUI components for presenting information from the plurality of objects in the overview page for the first object. The GUI can display the several second GUI components in the overview screen in an order defined by a personalization setting associated with a user, each of the several second GUI components using one of the auto load mode and the deferred load mode based on the personalization setting. The GUI can omit at least one of the several second GUI components when displaying the overview screen based on the operation mode setting. The information can include a table, and the GUI can present the information in the second GUI component using a pagination function wherein the table is distributed over more than one user-selectable page. The computer system can initiate an object services function in response to an input made using the second GUI component. The GUI can update the first and second GUI components for a third object instead of the first object, the updating being done in response to a user selecting an input control in the second GUI component that identifies the third object.

Implementations can provide some or all or none of the following advantages. An improved GUI can be provided. A more intuitive presentation of relevant information can be provided. A flexible configuration of GUI contents can be provided, where user preferences can be implemented. An improved overview screen for a complex business object can be provided. A GUI can be provided that handles the presentation of a large number of table entries in a component in a way that is intuitive, efficient and transparent to the user. A GUI can be provided in which all or nearly all relevant information of the object is displayed, and wherein the user can navigate to a related object, the information of which may not be relevant in the initial view.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is an example of an overview page for a business object.

FIG. 2 is an example of a page for personalizing a business object overview page.

FIG. 3 is an example of an overview page after personalization has been applied.

Like reference symbols in the various drawings indicate like elements.

DETAILED DESCRIPTION

Figure 1:
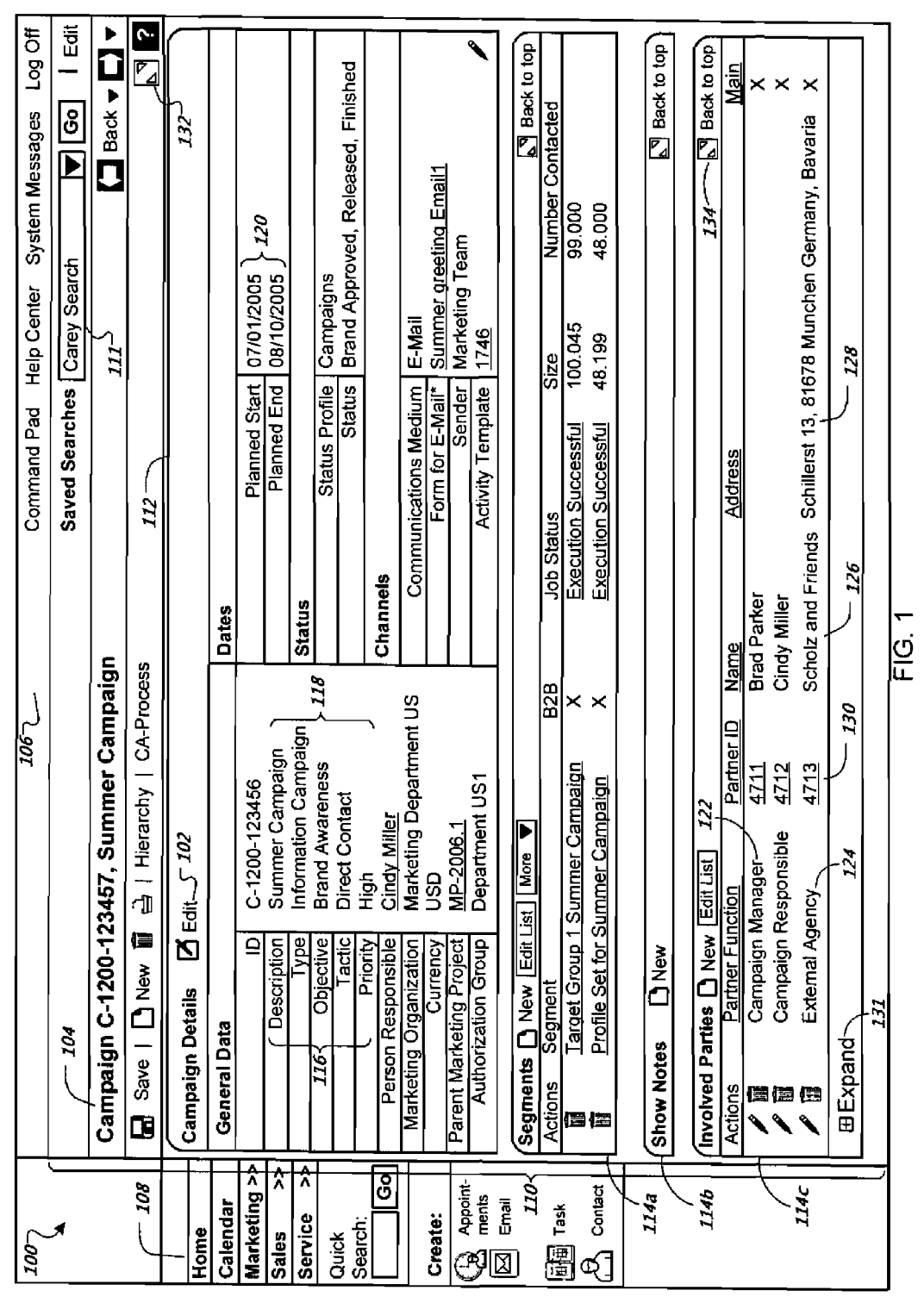
Figure 4:
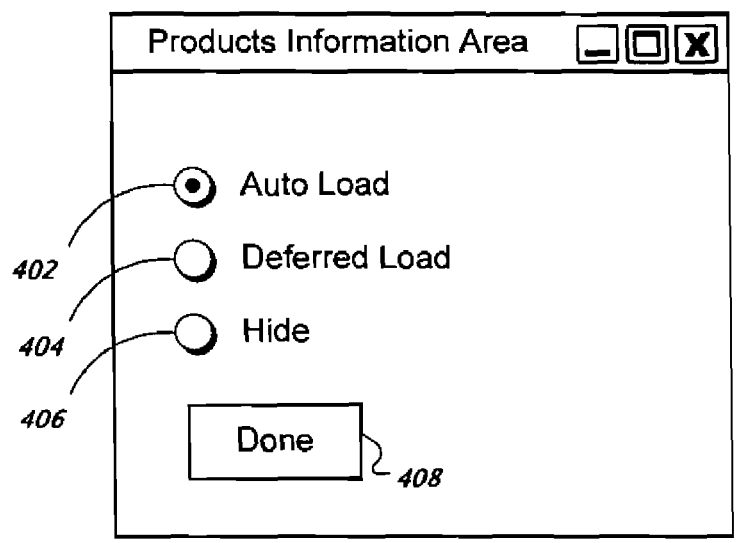
FIG. 4 is an example of a screen that can be used to configure an operation mode setting.

FIG. 1 shows an overview page 100 for a business object in a graphical user interface (GUI). The overview page 100 can be generated in an enterprise computing system to present overview information about any or all of several objects used there. In some implementations, the overview page 100 can be the sole target of links to a business object. For example, while viewing an interface, a user may select a link that is a reference to a business object, and the overview page 100 can be displayed in response to the user selection. In some implementations, the overview page 100 can display read-only information about a business object. For example, in such an implementation the user can edit the business object by selecting a link 102, which can result in the display of another page on which the user can edit the object. Here, the overview page 100 presents attributes of the business object, and also information from an associated object in a GUI component that has a configurable operation mode setting.

A business object can represent an entity or concept in a particular business context. Accordingly, the system can include several objects having more than one type. For example, a business object can represent a sales order, a product or an advertising campaign. Business objects can be grouped into categories based on the concept they represent. For example, all sales order business objects can be grouped into a sales order category, and all advertising campaign business objects can be grouped into an advertising campaign category.

Business object categories can be represented by a category name, which can identify the type of a business object. For example, the overview page 100 displays information about an example business object which has a category name of "Campaign" The object displayed in the overview page 100 represents an advertising campaign, which can be part of a marketing plan. The marketing plan can include one or more campaigns. An advertising campaign can have one or more components, or elements, associated with it. For example, an advertising campaign can involve a preparatory stage, sending correspondence to customers, and evaluating results, and each of these can have a corresponding element in the system.

The overview page 100 has a toolbar 106 on the top of the screen. The toolbar 106 can provide access to general functionality, such as help resources and a log-off link. The overview page 100 can also have a navigation area 108 on the left side of the screen. The navigation area 108 can provide access to other areas of the system, including work center screens which are related to the displayed business object and/or to other business objects. For example, the navigation area 108 here includes links to marketing, sales and service work center areas, each of which can be displayed on a separate screen.

The overview page 100 can be reached by a user as a result of the user viewing and selecting a link to an object displayed on a work center screen. As another example, the user can navigate to an overview page by navigating to a search screen using the navigation area 108, performing a search, and then selecting an item in a search results list.

The overview page 100 can have an overview area 110 which can occupy an area of the screen not taken up by the toolbar 106 and the navigation area 108. The overview area 110 can be used to display information related to the selected business object. The overview area 110 can include a search component 111 which can be used to search for business objects. The overview area 110 can include a first graphical user interface (GUI) component 112 and one or more second GUI components, such as components 114a-c. In some implementations, the toolbar 106 and the navigation area 108 are considered as separate from the overview area 110. For example, the overview area 110 in such an implementation can be updated without any change in the toolbar 106 or the area 108. As another example, the toolbar 106 and the area 108 can also be used when content other than the overview area 110 is presented in the page 100.

The GUI component 112 can display any or all attributes of a selected business object. For each business object type, a list of attributes can be identified which describe business object instances of that type. Advertising campaign business objects can be characterized by attributes 116 such as description, type, objective, tactic and priority attributes, to name a few examples. A particular business object instance can have one or more attribute values 118 associated with each attribute 116. For example, the campaign business object displayed in the overview page 100 has a value of "Summer Campaign" for the description attribute, a value of "Information Campaign" for the type attribute, a value of "Brand Awareness" for the objective attribute, a value of "Direct Contact" for the tactic attribute and a value of "High" for the priority attribute. The GUI component 112 displays other attribute values for the example campaign business object, such as planned start and end date attributes 120. In some implementations, the GUI component 112 includes the attributes that a user has the authority to edit, for example by invoking the link 102. These attributes can be presented whether or not the GUI component 112 permits editing. In other implementations, the user can be authorized to view all data related to an object, but not to edit any of the data.

The overview area 110 can include GUI components, such as components 114a-c, which can display information about instances of the business objects that are associated with the selected business object instance. For example, a campaign business object can be related to business objects which represent people, such as a campaign manager 122, and which are therefore displayed in GUI component 114c, which displays business objects which represent parties (e.g., people or organizations) who are involved in the campaign. Another example is an external agency business object 124. Thus, associated business object instances which are of the same type of business object can be grouped by type.

GUI components that display information from associated business objects can display a subset of attributes for the associated object instance. For example, a name 126 and an address 128 of the external agency business object 124 are displayed in the GUI component 114c. GUI components such as 114a can display a link, such as link 130, which can provide a way for a user to reach a different overview page for an associated business object instance. For example, if the user clicks on link 130, an overview page can be displayed for the external agency business object 124. Such an overview page can have its respective information presented by GUI components similar to those of the page 100.

The GUI components 114a-c can alternatively be configured to present data of the associated object(s) in other ways. For example, one or more of the GUI components can have the ability to present information in table form. Such a GUI component can be provided with a pagination function that distributes the table-based information over one or more user-selectable pages. When the table content is too large to be shown all at once in the GUI component, the pagination function can provide selective presentation of any of a number of pages. For example, an expand link 131 can be activated to expand the GUI component 114c to a predetermined number of entries—e.g., up to 50 entries. If there are more than the predetermined number of entries, the pagination function can be automatically initiated. The pagination function can display a customizable number of table entries at a time on several user-selectable pages. Upon being initially clicked, the expand link 131 can change to a "collapse" link. If the collapse link is clicked, the GUI component can display the initial number of table entries.

As another example, the GUI components can provide a function that can be selectively initiated by the user. Such a function can include an object services function to be applied to the current object. For example, the object services function can involve retrieving or generating administration data, changing a document or accessing a workflow log.

GUI components 114a-c can have an operation mode that controls the loading of the associated object data. The operation mode can be auto load or deferred load, to name two examples. In auto load mode, associated object attributes are automatically loaded and presented upon the overview page 100 being displayed. This means that these attributes can be immediately visible to the user upon reaching the page 100. For example, GUI components 114a and 114c have been configured with an operation mode of auto load and their attributes (retrieved upon loading of the page) are currently displayed on the screen.

For a GUI component operating in deferred load mode, in contrast, associated object attributes are not immediately loaded and presented when the page 100 is displayed. Rather, they are retrieved upon the user activating the particular GUI component. For example, GUI component 114b is configured with the deferred load mode and none of its attributes have currently been retrieved. The user can activate the GUI component 114b (such as by selecting the "Show Notes" link) to trigger the loading and presentation of the associated object attributes. Configuring one or more GUI components to be in deferred load mode can result in faster load times when the overview page 100 is initially displayed, while providing that the user is nevertheless informed about what information is available on the page.

The user can configure the operation mode setting for GUI components by selecting a "Personalize" icon, such as icon 132. Selecting icon 132 can result in the display of an interface which can allow the user to configure whether GUI components are to operate in auto load mode or deferred load mode. The user may also be able to specify that particular GUI components should be hidden upon display of an overview page 100. The user can customize a particular GUI component by clicking on a personalize icon 134. Selecting icon 134 can result in the display of an interface which can allow the user to define which fields in the GUI component are visible, to name one example. This, too, can be advantageous to the user, because it can provide a screen that is more relevant to the user's needs, and the need to load and display certain less relevant screen content is eliminated.

FIG. 2 is an interface 200 that can allow users to personalize a business object overview page 100. Business objects can be complex, can include a lot of information, and can be related to many associated objects. The overview page 100 may not be large enough to display all associated objects of a business object without requiring the user to scroll. Users may desire to see associated objects that are important to them without having to scroll and users may also desire to hide associated objects which are not important to them. The importance of associated objects can be subjective and may vary by user.

A personalization interface 200 can be provided that can allow users to control the presence or absence of specific GUI components, and their order, for an overview page 100 of a business object. The interface 200 can include a list 202 of GUI components that are available and a list 204 of GUI components that are selected for the page. The list 202 can include all GUI components that are available to be displayed for a business object. The list 204 can show one or more of the GUI components from the list 202 that the user has selected to be displayed on the overview page 100, and can also reflect the order in which the GUI components will be arranged on the page.

Users can move GUI components from the list of available GUI components 202 to the list of displayed GUI components 204 by first selecting one or more GUI components in the list 202 and then selecting a "right" button 206. Users can move GUI components from the displayed GUI component list 204 to the available list 202 by selecting them in the displayed list 204 and selecting a "left" button 208. When a GUI component is moved to one of the lists 202 and 204, it can likewise be removed from the list it was moved from. Users can change the order in which GUI components will be arranged on the overview page 100 by selecting a GUI component in the displayed GUI component list 204 and selecting an up button 210 or a down button 212.

The user can apply the personalization changes they have made by selecting an apply button 214. This can trigger the system to refresh the page that is being personalized. The user can reset the order of GUI components to a default order by selecting a reset button 216. The user can close the interface 200 without saving personalization changes by selecting a cancel button 218.

As an example of personalization, consider that the overview page 100 from FIG. 1 currently displays GUI components entitled "Campaign Details", "Segments", "Notes" and "Involved Parties". The list 204 currently displays these GUI components and also an additional "Planning" GUI component 220. For example, a user moved the component 220 from the available list 202 to the displayed list 204, where it was initially positioned at the bottom of the list 204. The user may have moved the GUI component 220 upward to its current position by activating the up button 210. If the user is then done, the apply button 214 can be used to initiate the corresponding change in the overview page.

Figure 3:
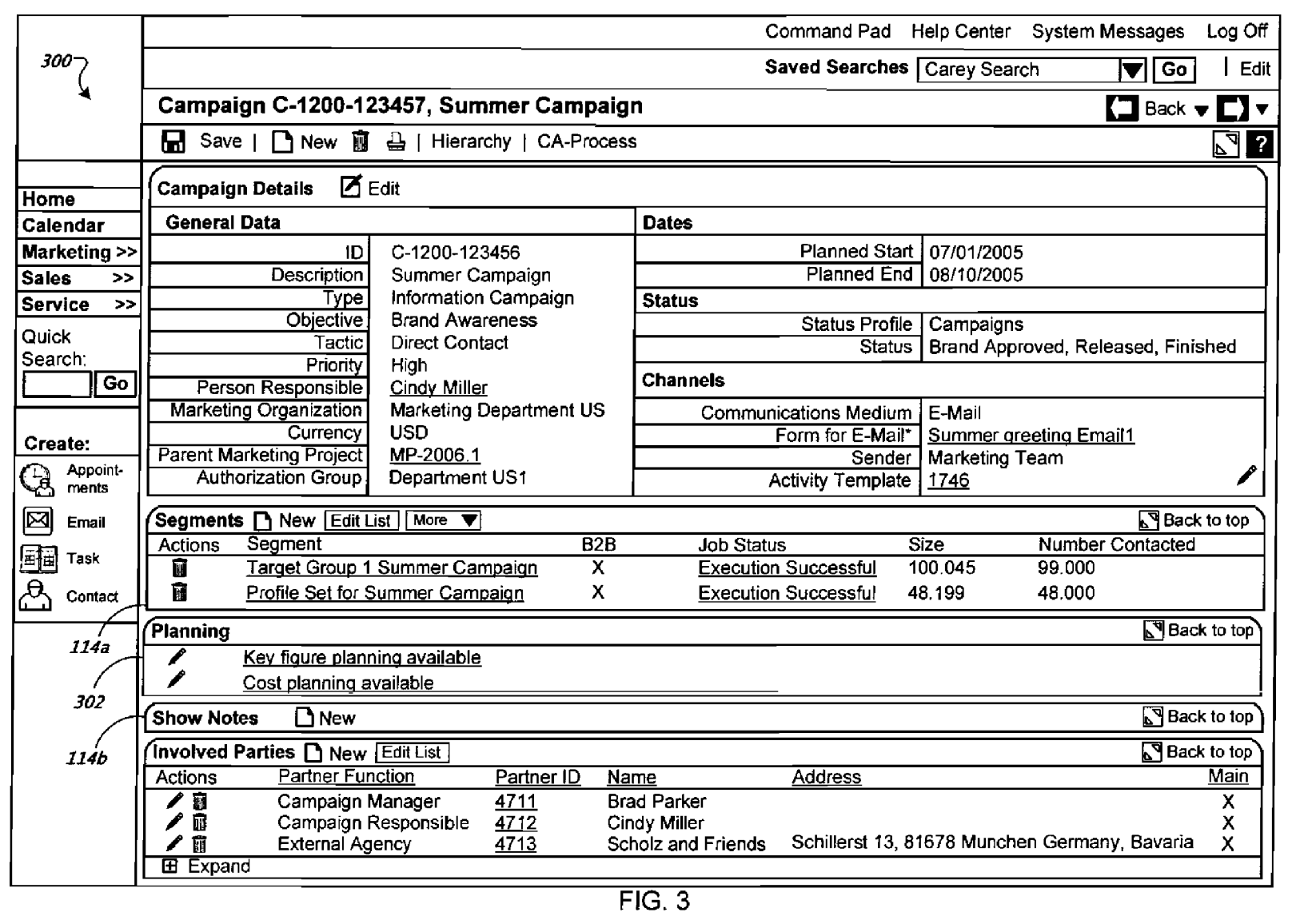

FIG. 3 is an example of an overview page 300 after personalization has been applied, such as personalization changes that may have been done to the page 100. A GUI component 302 entitled "Planning" has here been inserted and has been positioned between the GUI component 114a (entitled "Segments") and the GUI component 114b (entitled "Show Notes"). The user may have added the GUI component 302 and adjusted its position using the page 200 (FIG. 2). In this example, the page 100 and page 300 are identical except for GUI component 302.

FIG. 4 is an example screen 400 that can be used to configure an operation mode setting for a GUI component, such as GUI component 114a (FIG. 1). The screen 400 shows example operation modes, such as an auto load option 402, a deferred load option 404, and a hide option 406. In auto load mode, GUI component attributes are automatically loaded and presented in the GUI component upon the overview page 100 being displayed. In deferred load mode, GUI component attributes are not immediately displayed, but rather are retrieved if and when the user activates the GUI component. The user can select the hide option 406 to prevent a GUI component from appearing on an overview page 100. The user can save the operation mode setting by activating a "Done" button 408. The setting can be stored in form of a flag for the GUI component that is either set or not set depending on the user's input in the screen 400.

The example screen 400 is for a "Products" GUI component. The "Products" GUI component may be related to multiple objects, such as campaign, sales order and opportunity objects. An operation mode setting can be saved for each object relationship a GUI component may be involved in. This can allow for a GUI component to operate differently in different contexts. For example, a "Products" GUI component can be configured to be auto loaded when it is displayed on an overview page 100 for a "Campaign" object, to be in deferred load mode when displayed on an overview page 100 for a "Sales Order" object, and hidden when an overview page 100 for a "Opportunity" object is displayed.

An administrator can have the ability to configure operation mode settings. Operation mode settings can be saved on a per-user or system-wide basis. Operation mode settings can be associated with user roles. The screen 400 can be a separate, standalone screen or it can be integrated into the page 200. For example, in the page 200 shown above the user can cause a GUI component to not be displayed (i.e., to be hidden) by making sure it is not placed in the list 204. That is, operation mode settings and personalization settings can be controlled on separate pages, or on a common page, to name a few examples.

Figure 5:
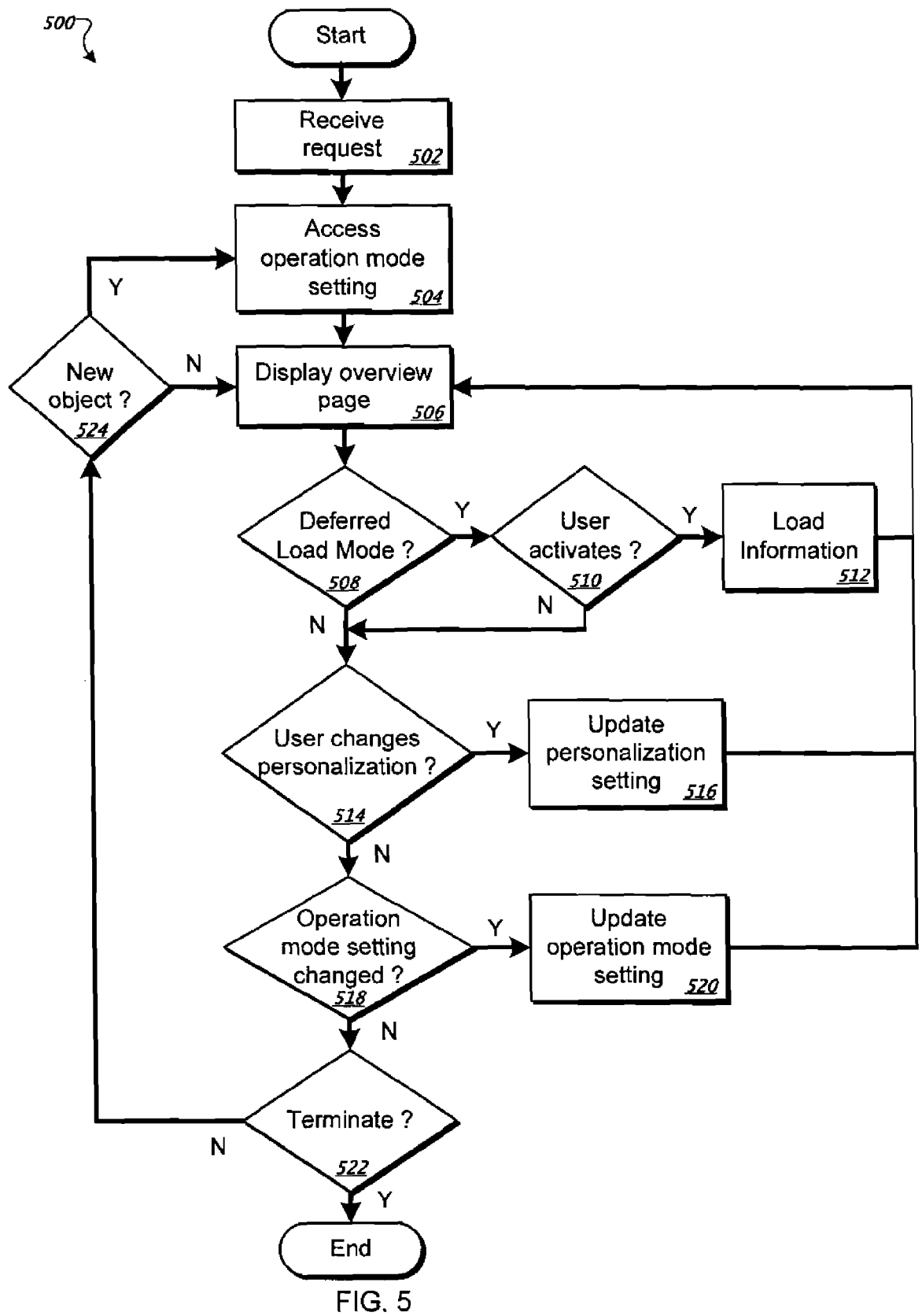
FIG. 5 is a flowchart for a method for displaying an object in an overview page.

FIG. 5 is a flowchart for a method for displaying an object in an overview page. In step 502, a request is received to display to a user a first object in a GUI of a computer system. The computer system contains several objects having more than one type and some of the objects may be associated with each other. For example, a request to display the page 100 can be received when a user clicks on a link to a corresponding object.

In step 504, an operation mode setting is accessed. For example, an operation mode for controlling the loading of GUI components as defined in the screen 400 can be accessed.

In step 506, an overview screen is displayed in response to the request to display the first object. The overview screen can include a first GUI component for presenting attributes of the first object and at least one second GUI component for presenting information from at least a second one of the several objects that is associated with the first object. The second GUI component can be configured to operate in an auto load mode where the information is automatically loaded and presented upon the overview page being displayed, or in a deferred load mode where the information is loaded and presented upon the user activating the second GUI component. The second GUI component uses one of the auto load mode and the deferred load mode based on the operation mode setting. For example, the page 100 can be displayed, with GUI component 114b (FIG. 1) being configured to the deferred load mode.

In step 508, it is determined whether any GUI component is configured to operate in deferred load mode. For each GUI component displayed in deferred load mode, step 510 is performed. In step 510, it is determined whether the user has activated that GUI component. If the user activates a deferred load GUI component, step 512 is performed. In step 512, information is retrieved for the activated GUI component. Attribute information for the objects included in the GUI component can be loaded. For example, if the user activates the GUI component 114b its information can be retrieved in step 512. After step 512 is performed, step 506 is performed, and the loaded attributes can be displayed in the overview page.

If there are no GUI components configured to be in deferred load mode (step 508), or if the user does not activate any GUI components configured to be in deferred load mode (step 510), step 514 is performed. In step 514, it is determined whether personalization changes have been made. For example, personalization changes may have been made using page 200. If personalization changes have been made, step 516 is performed. In step 516, personalization settings are updated. For example, GUI components may have been added, removed, or reordered. After step 516 has been performed, step 506 is performed and the overview page is displayed. The contents of the overview page 100 may change to reflect the personalization changes there were updated in step 516.

If no personalization changes have been made (step 514), step 518 is performed. In step 518, it is determined whether an operation mode setting has changed. For example, operation mode settings may have been changed using screen 400. If an operation mode setting has been changed, step 520 is performed. In step 520, operation mode settings are updated. For example, an operation mode setting for a GUI component may have been changed from auto load to deferred load mode.

After step 520, step 506 is performed, and the overview page is displayed. The contents of the overview page 100 may change to reflect the updated operation mode settings. For example, a GUI component which had previously been displayed may now be hidden.

If operation mode settings have not been changed (step 518), step 522 is performed. In step 522, it is determined whether to terminate the operations. For example, the user can terminate the operations by closing the page 100. If the operations are not to be terminated, step 524 is performed.

In step 524, it is determined whether the user has requested to display a new object, such as by selecting an input control in the second GUI component that identifies an object. If a new object is to be displayed, step 504 is performed and the operation mode settings of the GUI components of the new object are accessed. If a request to display a new object has not been received (step 524), step 506 is performed and the current object continues to be displayed in the overview page 100.

Figure 6:
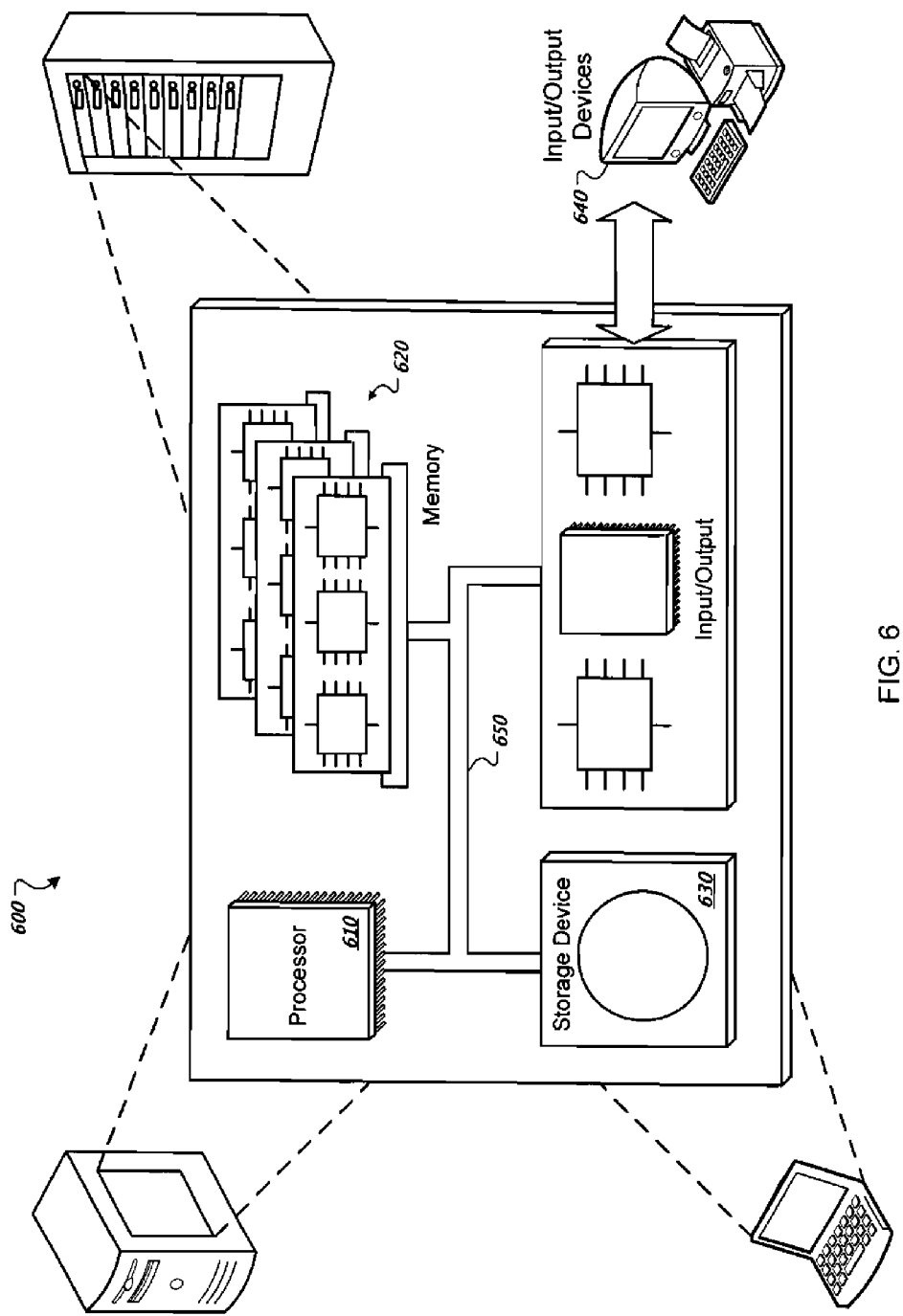
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for providing an overview of an object, the method comprising:

receiving a request to display to a user a first object in a graphical user interface (GUI) of a computer system, the first object being one of multiple objects that are contained in the computer system, the multiple objects having more than one object type, some of the multiple objects being associated with the first object;

displaying an overview screen on the GUI in response to the request, the overview screen comprising:

a first GUI component for presenting attributes of the first object; and at least one second GUI component, each second GUI component for presenting information from a group of objects that are associated with the first object and that are of an object type that is assigned to the second GUI component, each second GUI component being configured to operate in (i) an auto load mode where the second GUI component with the information is automatically loaded and presented upon the overview screen being displayed, and (ii) a deferred load mode where the second GUI component is presented upon the overview screen being displayed but the information is loaded and presented upon the user activating the second GUI component that has been displayed in the overview screen, wherein each second GUI component uses one of the auto load mode and the deferred load mode based on a single operation mode setting specific to the second GUI component, the operation mode setting for each second GUI component being read in response to the request and before loading the information, wherein the single operation mode setting of each second GUI component is read when presenting the second GUI component in response to requests to display to the user objects of a certain type in the first GUI component, and wherein another single operation mode setting of the second GUI component is read when presenting the second GUI component in response to requests to display to the user objects of a different type in the first GUI component;

receiving user selection in a particular second GUI component of the at least one second GUI component of an input control that identifies a selected object from the group of objects that are of a type assigned to the particular second GUI component;

updating the first GUI component to present attributes of the selected object as opposed to attributes of the first object; and updating the at least one second GUI component to display information for one or more groups of objects that are associated with the selected object as opposed to one or more groups of objects that are associated with the first object, wherein the one or more groups of objects that are associated with the selected object can include the first object.

2. The computer-implemented method of claim 1, wherein the overview screen is a target for all links to the first object in the computer system.

3. The computer-implemented method of claim 1, further comprising displaying all user-editable attributes of the first object in the first GUI component.

4. The computer-implemented method of claim 1, wherein there exists multiple second GUI components for presenting information from groups of objects that are associated with the object type of the first object and that are assigned to the multiple second GUI components.

5. The computer-implemented method of claim 4, further comprising:

displaying a personalization interface for allowing a user to personalize the display of multiple second GUI components on the overview screen, the personalization interface including: (i) a list of second GUI components that are available for display on the overview screen, and (ii) a list of second GUI components that are selected for display on the overview screen, wherein the personalization interface allows the user to move second GUI components from the list of second GUI components that are available to the list of second GUI components that are selected for display, and wherein the personalization interface allows the user to change a personalization setting associated with the user by defining an order in which the second GUI components that are selected for display are to be displayed in the overview screen; and displaying the second GUI components that are selected for display in the overview screen as the multiple second GUI components (i) based on the multiple second GUI components being in the list of second GUI components that are selected for display, and (ii) in an order defined by the personalization setting associated with the user, each of the multiple second GUI components using one of the auto load mode and the deferred load mode based on a single operation mode setting specific to each second GUI component.

6. The computer-implemented method of claim 5, further comprising omitting at least one of the second GUI components that are available for display on the overview screen when displaying the overview screen based on the omitted at least one second GUI component being omitted from the list of second GUI components that are selected for display on the overview screen.

7. The computer-implemented method of claim 1, wherein the information comprises a table, further comprising presenting the information in the second GUI component using a pagination function wherein the table is distributed over more than one user-selectable page.

8. The computer-implemented method of claim 1, further comprising initiating an object services function in response to an input made using the second GUI component.

9. The computer-implemented method of claim 1, further comprising displaying another second GUI component in the overview screen, the another second GUI component using one of the auto load mode and the deferred load mode based on another single operation mode setting specific to the another second GUI component, the another single operation mode setting for the another GUI component in the overview screen being different than the operation mode setting.

10. The computer-implemented method of claim 1, wherein at least one object in the group of objects includes multiple GUI component attributes, wherein in the deferred load mode none of the GUI component attributes are loaded and presented upon the user activating the second GUI component, and wherein in the auto load mode the GUI component attributes are loaded and presented upon the overview screen being displayed.

11. A machine-readable storage device having tangibly embodied therein a computer program product that comprises instructions that when executed by a processor perform a method for providing an overview of an object, the method comprising:

receiving a request to display to a user a first object in a graphical user interface (GUI) of a computer system, the first object being one of multiple objects that are contained in the computer system, the multiple objects having more than one object type, some of the multiple objects being associated with the first object;

displaying an overview screen on the GUI in response to the request, the overview screen comprising:
a first GUI component for presenting attributes of the first object; and
at least one second GUI component, each second GUI component for presenting information from a group of objects that are associated with the first object and that are of an object type that is associated with the second GUI component, each second GUI component being configured to operate in (i) an auto load mode where the second GUI component with the information is automatically loaded and presented upon the overview screen being displayed, and (ii) a deferred load mode where the second GUI component is presented upon the overview screen being displayed but the information is loaded and presented upon the user activating the second GUI component that has been displayed in the overview screen, wherein each second GUI component uses one of the auto load mode and the deferred load mode based on a single operation mode setting specific to the second GUI component, the operation mode setting for each second GUI component being read in response to the request and before loading the information, wherein the single operation mode setting of each second GUI component is read when presenting the second GUI component in response to requests to display to the user objects of a certain type in the first GUI component, and wherein another single operation mode setting of the second GUI component is read when presenting the second GUI component in response to requests to display to the user objects of a different type in the first GUI component;

receiving user selection in a particular second GUI component of the at least one second GUI component of an input control that identifies a selected object from the group of objects that are of a type assigned to the particular second GUI component;

updating the first GUI component to present attributes of the selected object as opposed to attributes of the first object; and updating the at least one second GUI component to display information for one or more groups of objects that are associated with the selected object as opposed to one or more groups of objects that are associated with the first object, wherein the one or more groups of objects that are associated with the selected object can include the first object.

12. A machine-readable storage device having tangibly embodied therein a computer program product, the computer program product including instructions that, when executed, generate on a display device a graphical user interface for providing an overview of an object, the graphical user interface comprising:

a first GUI component for presenting to a user attributes of a first object in an overview screen of a computer system, the first object being one of multiple objects that are contained in the computer system, the multiple objects having more than one object type, some of the multiple objects being associated with the first object; and at least one second GUI component, each second GUI component for presenting information from a group of objects that are associated with the first object and that are of an object type that is assigned to the second GUI component, each second GUI component being configured to operate in (i) an auto load mode where the second GUI component with the information is automatically loaded and presented upon the GUI being generated, and (ii) a deferred load mode where the second GUI component is presented upon the GUI screen being displayed but the information is loaded and presented upon the user activating the second GUI component that has been displayed in the GUI, wherein each second GUI component uses one of the auto load mode and the deferred load mode based on a single operation mode setting specific to the second GUI component, the operation mode setting for each second GUI component being read in response to a request to generate the GUI and before loading any information from the group of objects, wherein the single operation mode setting of each second GUI component is read when presenting the second GUI component in response to requests to display to the user objects of a certain type in the first GUI component, and wherein another single operation mode setting of the second GUI component is read when presenting the second GUI component in response to requests to display to the user objects of a different type in the first GUI component wherein the GUI receives user selection in a particular GUI component of the at least one second GUI component of an input control that identifies a selected object from the group of objects that are of a type assigned to the particular second GUI component, wherein the GUI updates the first GUI component to present attributes of the selected object as opposed to attributes of the first object, and wherein the GUI updates the at least one second GUI component to display information for one or more groups of objects that are associated with the selected object as opposed to one or more groups of objects that are associated with the first object, wherein the one or more groups of objects that are associated with the selected object can include the first object.

13. The machine-readable storage device of claim 12, wherein the first and second GUI components are included on an overview screen that is a target for all links to the first object in the computer system.

14. The machine-readable storage device of claim 12, wherein there exists multiple second GUI components for presenting information from groups of objects that are associated with the object type of the first object and that are assigned to the multiple second GUI components.

15. The machine-readable storage device of claim 14, wherein the GUI displays a personalization interface for allowing a user to personalize the display of multiple second GUI components on the overview screen, the personalization interface including: (i) a list of second GUI components that are available for display on the overview screen, and (ii) a list of second GUI components that are selected for display on the overview screen, wherein the personalization interface allows the user to move second GUI components from the list of second GUI components that are available to the list of second GUI components that are selected for display, and wherein the personalization interface allows the user to change a personalization setting associated with the user by defining an order in which the second GUI components that are selected for display are to be displayed in the overview screen; and wherein the GUI displays the second GUI components that are selected for display in the overview screen as the multiple second GUI components (i) based on the multiple second GUI components being in the list of second GUI components that are selected for display, and (ii) in an order defined by the personalization setting associated with the user, each of the multiple second GUI components using one of the auto load mode and the deferred load mode based on a single operation mode setting for each GUI component.

16. The machine-readable storage device of claim 12, wherein the GUI omits at least one of the second GUI components that are available for display on the overview screen when displaying the overview screen based on the omitted at least one second GUI component being omitted from the list of second GUI components that are selected for display on the overview screen.

17. The machine-readable storage device claim 12, wherein the information comprises a table, and wherein the GUI presents the information in the second GUI component using a pagination function wherein the table is distributed over more than one user-selectable page.

18. The machine-readable storage device of claim 12, wherein the computer system initiates an object services function in response to an input made using the second GUI component.

* * * * *